United States Patent
Kato et al.

[11] Patent Number: 6,053,758
[45] Date of Patent: Apr. 25, 2000

[54] DOOR TRIM CONNECTOR CONNECTING STRUCTURE

[75] Inventors: Mitsunobu Kato; Yasuyoshi Serizawa, both of Shizuoka, Japan

[73] Assignee: Yazaki Corporation, Tokyo, Japan

[21] Appl. No.: 09/030,020

[22] Filed: Feb. 25, 1998

[30] Foreign Application Priority Data

Feb. 27, 1997 [JP] Japan ..................... 9-043472

[51] Int. Cl.⁷ .................................................. H01R 13/627
[52] U.S. Cl. ............................................................ 439/364
[58] Field of Search ............................ 439/34, 341, 362, 439/364

[56] References Cited

U.S. PATENT DOCUMENTS

| | | | |
|---|---|---|---|
| 3,617,985 | 11/1971 | Kehl | 439/341 |
| 4,865,560 | 9/1989 | Thomas | 439/362 X |
| 4,869,681 | 9/1989 | Vache et al. | 439/341 |
| 5,431,581 | 7/1995 | Laudereau | 439/341 |

FOREIGN PATENT DOCUMENTS 1-249516  10/1989  Japan .

Primary Examiner—Khiem Nguyen
Attorney, Agent, or Firm—Armstrong, Westerman, Hattori, McLeland and Naughton

[57] ABSTRACT

A door trim connector connecting structure is provided. In one embodiment of such structure, the switch unit is provided with fixed connectors, a connector securing wall provided with movable connectors is integrally formed inside the bulging portion of the door trim panel, and the screw unit secures the switch unit at the same time as engaging the fixed connectors and the movable connectors. In another embodiment of the structure, the door trim panel is provided with an insertion and connector stays, a bolt 63 penetrating a movable connector is engaged with a trim receiving plate which can be inserted through the insertion hole, the trim receiving plate can be temporarily secured to the door trim panel, the movable connector is movably supported by a holder provided with slide protrusions to be received by the guide grooves, and the trim receiving plate is inserted through the insertion hole so as to screwing the movable connector to the fixed connector after the door trim panel is attached to the door inner panel.

7 Claims, 8 Drawing Sheets

DOOR TRIM CONNECTOR CONNECTING STRUCTURE

BACKGROUND OF THE INVENTION

1. Field of the Invention

The present invention relates to a door trim connector connecting structure for vehicles in which a connector on a door trim panel is engaged by screw tightening with a connector situated on the inner side of the door trim panel or on the door inner panel after the door trim panel is mounted to the door inner panel.

2. Related Art

Figure 7:
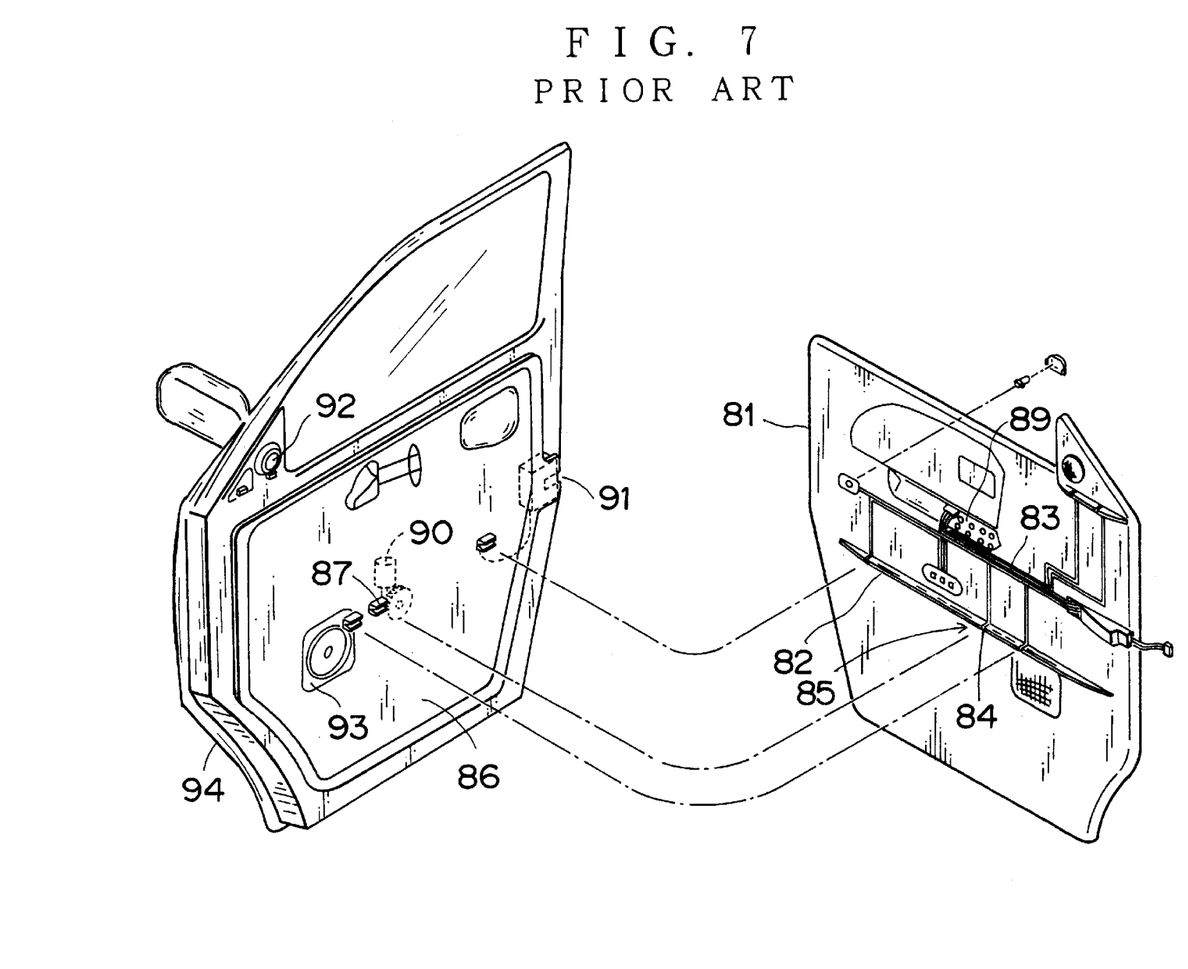
FIG. 7 is an exploded perspective view of the prior art.

FIG. 7 shows the connector connecting structure of a car door trim disclosed in Japanese Patent Application No. 8-185135.

In this structure, a rib 82 is formed in parallel with a door trim panel 81, conductors 84 of a circuit 83 are arranged for the rib 82 to form a plurality of male connectors 85, female connectors 87 for accommodating the male connectors 85 are formed on the door inner panel 81, and the door trim panel 81 is then mounted to the door inner panel 86 at the same time that the connectors 85 and 87 are connected.

Figure 8:
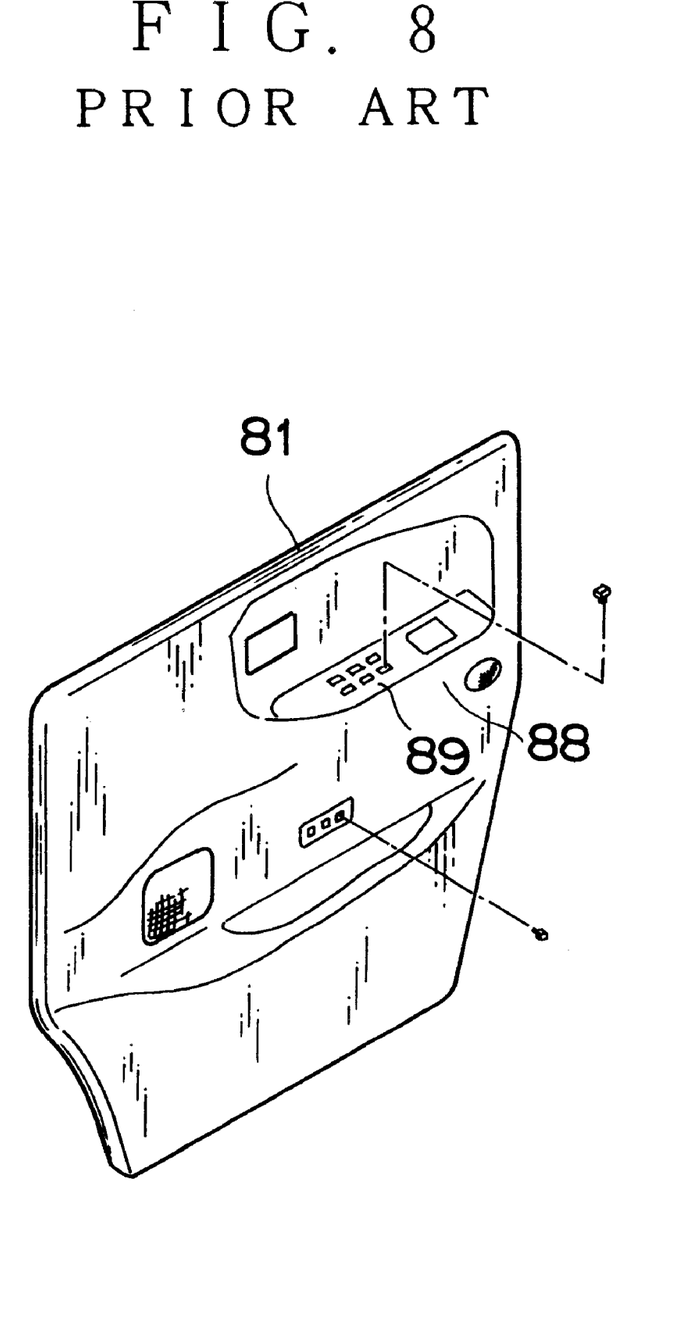
FIG. 8 is a perspective view of the surfaces of the door trim panel of the prior art.

The circuit 83 on the door trim panel 81 is connected to a door switch unit 89 provided on a bulging portion 88 (shown in FIG. 8) on the inner side of the car. The connectors 87 on the door inner panel 86 are connected to a power window motor 90, a door lock unit 91, a door mirror unit 92, and a speaker 93. Upon connection of the male and female connectors 85 and 87, the switch unit 89 is connected to the above auxiliary units 90, 91, 92, and 93.

Unlike other structures disclosed, for instance, in Japanese Patent Application Laid-Open No. 1-249516 in which a door inner panel already provided with various auxiliary units is mounted to an outer panel, lead wires of the motor 90 or the speaker 93 can be prevented from getting caught, and no damage is caused to the wire harness.

With the above conventional structure, however, it is necessary to minimize errors in attaching the door trim panel 81 and deformation of the door trim panel 81, because the connection between the switch unit 89 on the door trim panel side and a plurality of the auxiliary units 90 to 93 on the inner panel side depends on attachment of the door trim panel 81. With the structure in which the door trim panel 81 is first positioned in the upper portion of the door inner panel 86, it is necessary to maintain high mold accuracy, because the rib 82 should have flexibility so as to eliminate differences in angle between the male and female connectors 85 and 87.

SUMMARY OF THE INVENTION

The principal object of the present invention is to provide a door trim connector connecting structure in which connectors on a door trim panel can be smoothly and certainly connected without depending on attachment of the door trim panel to the door inner panel. It should be noted that this structure is not limited to the connection between connectors on the door trim panel side and connectors on the door inner panel side. This structure may be applied to connection between connectors only on the door trim panel side.

A first feature of the present invention is to provide a door trim connector connecting structure in which a switch unit securing wall protrudes from a door inner panel and is situated inside the bulging portion of a door trim panel, the switch unit is inserted into the bulging portion, and the pocket portion of the switch unit is screwed to the switch unit securing wall by means of a screw unit. Further in this structure, the switch unit is provided with fixed connectors, a connector securing wall is integrally formed inside the bulging portion, the connector securing wall is provided with movable connectors to be engaged with the fixed connectors, the screw unit secures the switch unit to the switch unit securing wall at the same time as engaging the fixed connectors and the movable connectors. Since the switch unit is rotatively moved and situated inside the bulging portion, with one end being the supporting point, the fixed connectors are arranged on both sides of the pocket at the opposite end to the supporting point.

A second feature of the present invention is to provide a door trim connector connecting structure in which a door trim panel is provided with a movable connector, an actuator is secured to a door inner panel, the movable connector is screwed to a fixed connector provided on the actuator. In this structure, the door trim panel is provided with an insertion hole, connector stays protrude from the back surface of the door trim panel, each of the connector stays is provided with a guide groove which extends in the longitudinal direction of the stays, a trim receiving plate which can be inserted through the insertion hole is engaged with a bolt which penetrates the movable connector main body, the trim receiving plate can be temporarily secured to the outer surface of the door trim panel, the movable connector main body is movably supported by a holder which is provided with slide protrusions to be received by the guide grooves, and after the door trim panel is attached to the door inner panel, the trim receiving plate is inserted through the insertion hole, and the movable connector is screwed to the fixed connector. The connector stays are arranged on both sides of the insertion hole. The insertion hole and the trim receiving plate are both rectangular. A stopper for stopping the trim receiving plate is provided on the outer surface of the door trim panel in the longitudinal direction of the insertion hole.

The above and other objects and features of the present invention will be more apparent from the following description taken in conjunction with the accompanying drawings.

DESCRIPTION OF THE PREFERRED EMBODIMENTS

The following is a detailed description of embodiments of the present invention, with reference to the attached drawings.

FIGS. 1 to 4 illustrate an embodiment of the door trim connector connecting structure according to the present invention.

In this structure, a switch unit 3 is mounted to a bulging portion 2 (equivalent to the bulging portion 88 in FIG. 8) on the inner side of a door trim panel 1 so that female connectors (fixed connectors) 4 of the switch unit 3 are connected to male connectors (movable connectors) 5 which are waiting connectors inside the bulging portion 2.

Figure 1:
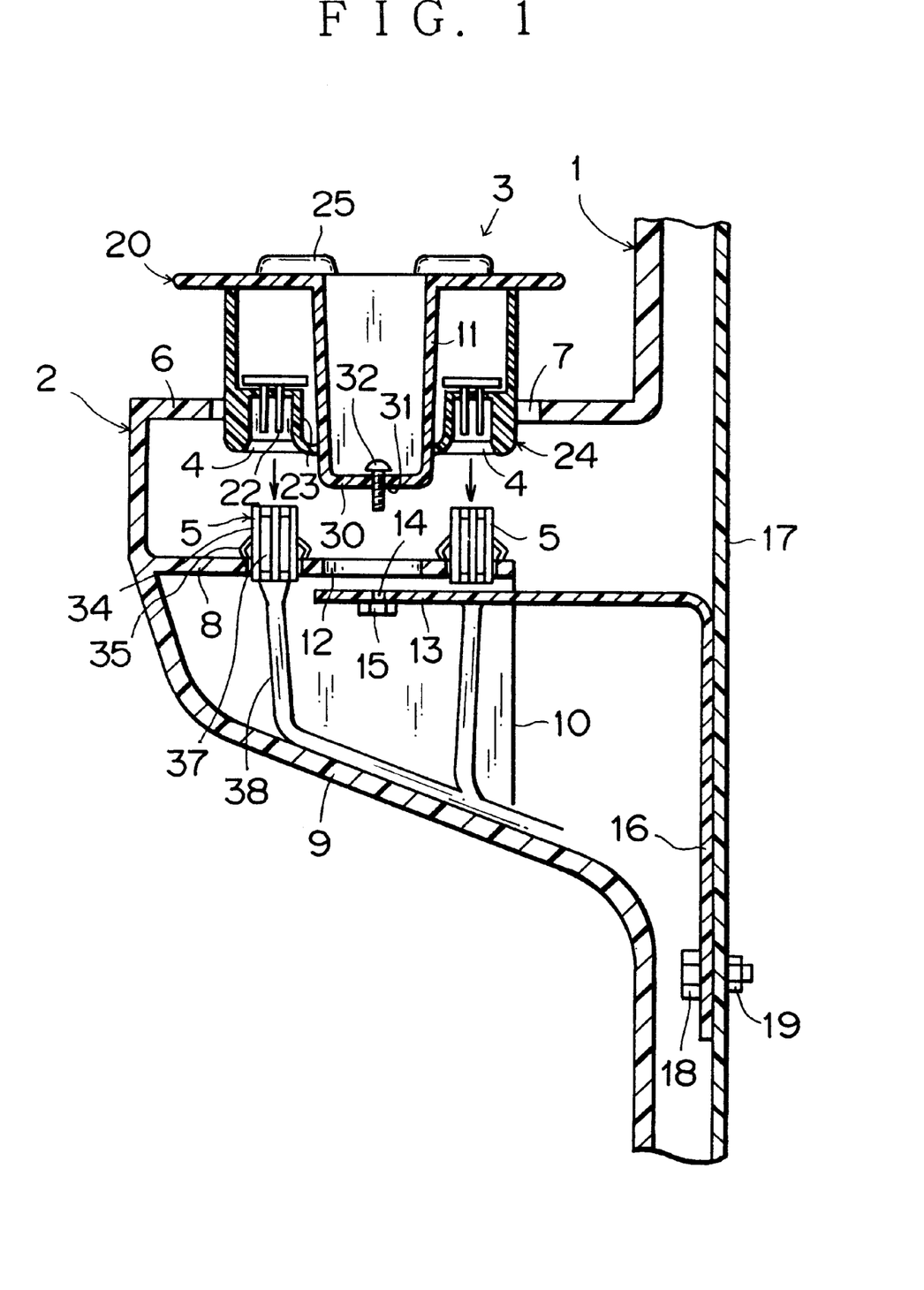
FIG. 1 is a longitudinal sectional view of a first embodiment of the door trim connector connecting structure according to the present invention.

An opening 7 for receiving the switch unit 3 is formed on an upper wall 6 of the bulging portion 2. In the mid portion of the inner side of the bulging portion 2 in the vertical direction, a connector securing wall 8 is formed in parallel with the upper wall 6. The connector securing wall 8 and the bulging portion 2 are integrally formed by resin. The connector securing wall 8 extends to a side wall 10 standing from an inclined bottom wall 9 in the bulging portion 2. The connector securing wall 8 is provided with an insertion hole 12 for accommodating a pocket 11 of the switch unit 3.

A switch unit securing wall 13 is arranged right below the connector securing wall 8 in parallel. The switch unit securing wall 13 is provided with a bolt insertion hole 14 and a weld nut 15 on the bottom surface. The switch unit securing wall 13 bends halfway and then extends vertically downward, so as to form a pull-handle bracket 16 which is secured to a door inner panel 17 by a bolt 18 and a nut 19.

Figure 2:
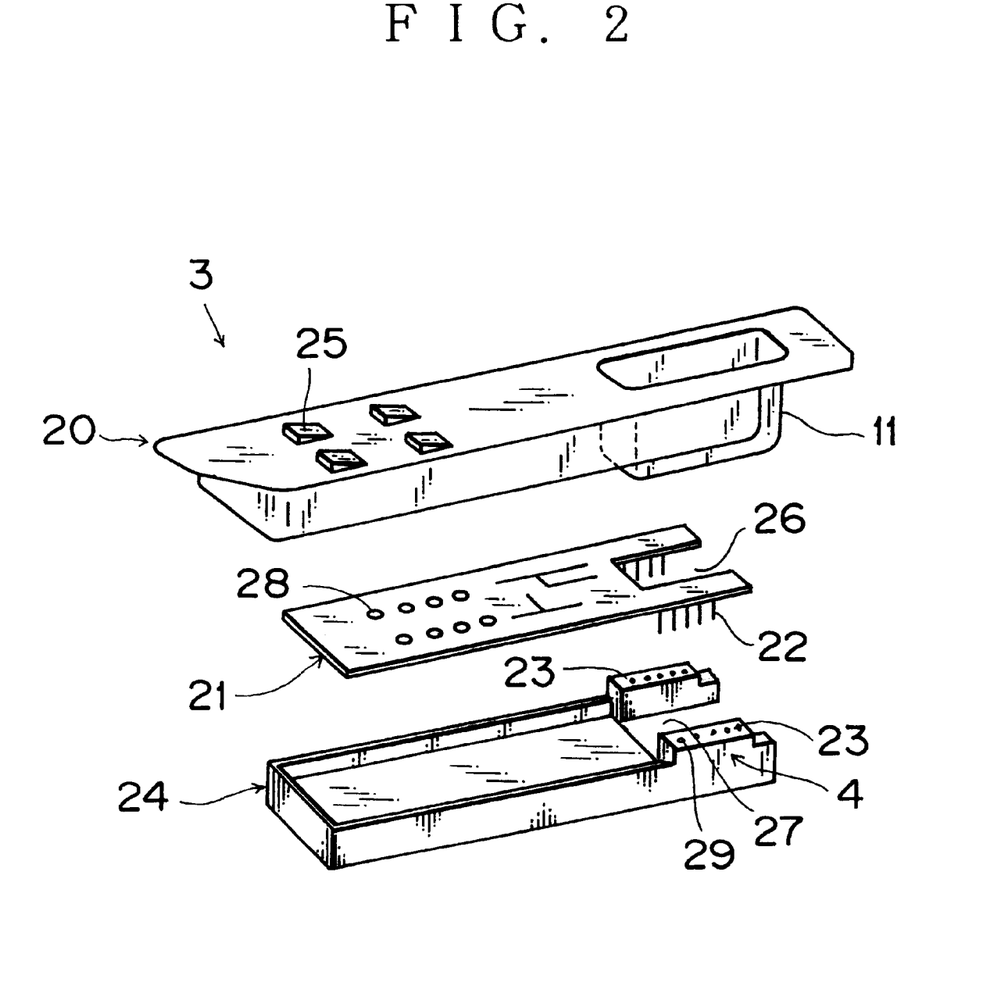
FIG. 2 is an exploded perspective view of a switch unit of the first embodiment.

As shown in FIG. 2, the switch unit 3 is made up of a upper case 20 made of a synthetic resin and having the pocket 11 in the rear portion, a control substrate 21 situated below the upper case 20, and a lower case 24 made of a synthetic resin and integrally having female connector housings 23 which accommodate male terminals 22 of the control substrate 21.

The upper case 20 is provided with a plurality of switch buttons 25 in the front portion. In the rear portions of the control substrate 21 and the lower case 24, rectangular insertion spaces 26 and 27 are formed to accommodate the pocket 11 so that the control substrate 21 and the lower case 24 can surround the pocket 11. The control substrate 21 is provided with a plurality of pin-like male terminals 22 protruding downward on two facing sides of the insertion space 26. Contact points 28 for receiving the switch buttons 25 are formed in the front portion of the control substrate 21. The female connector housings 23 of the lower case 24 are formed on the two facing sides of the insertion portion 27. The female connector housings 23 has insertion holes 29 on the upper surface for accommodating the male terminals 22.

In the structure of the switch unit 3 as shown in FIG. 1, the bottom (including the bottom wall 30) of the pocket 11 of the uppercase 20 is situated in a position lower than the lower case 24. A bolt insertion hole 31 is formed in the middle of the bottom wall 30 in the width direction. A securing screw (bolt) 32 for securing the weld nut 15 is inserted into the bolt insertion hole 31. The bottom of the pocket 11 passes through the insertion hole 12 and blocked by the switch unit securing wall 13 forming pull-handle bracket 16. Thus, the switch unit 3 is secured to the door trim panel 1 by the securing screw 32 and the weld nut 15. These securing means 32 and 15 are conventionally used. The male terminals 22 are inserted into the female connector housings 23 so as to form the female connectors 4 laterally facing each other.

Figure 3:
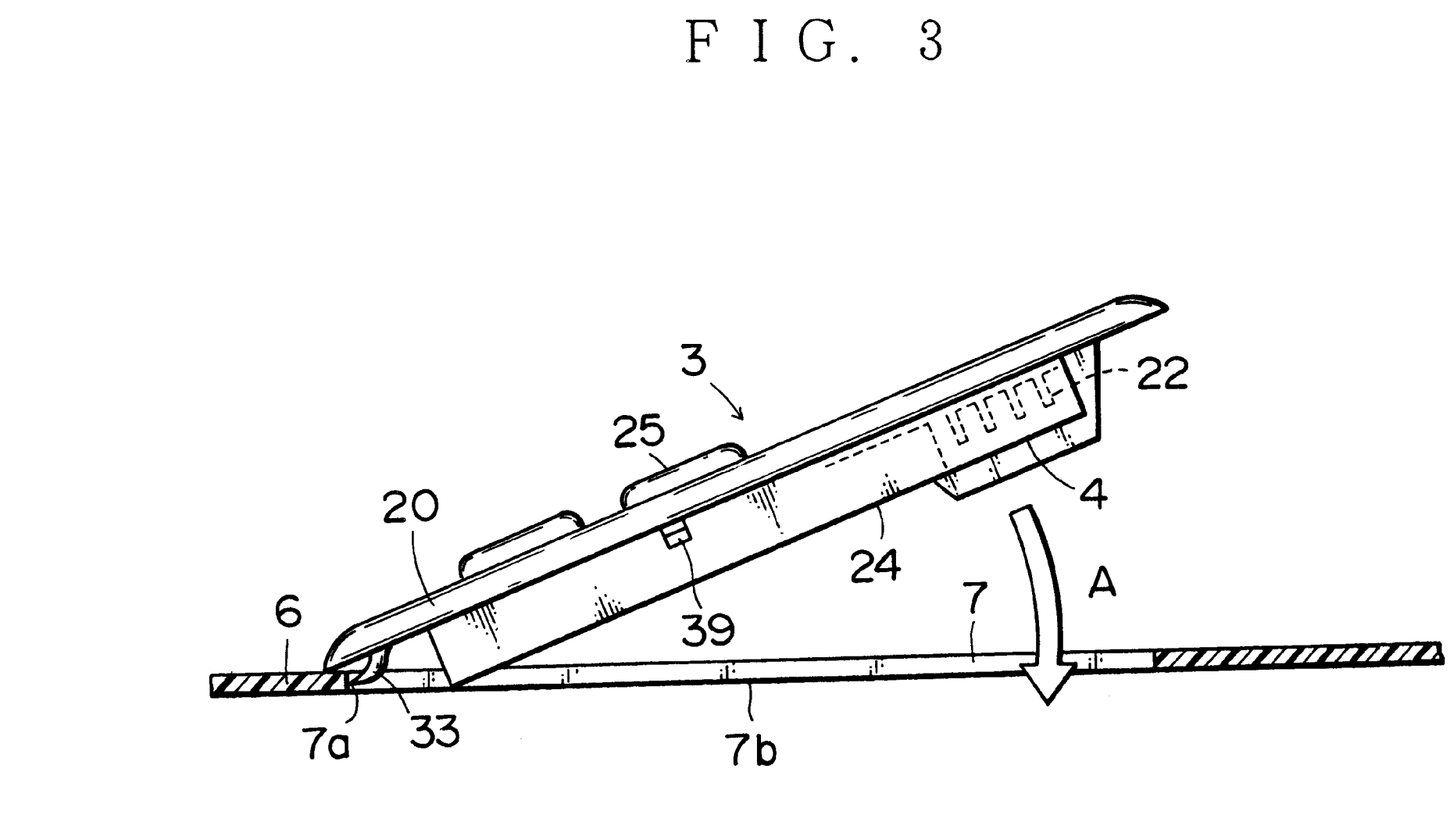
FIG. 3 is a side view illustrating how the switch unit is attached to the door trim panel.

As shown in FIG. 3, a hook 33 at the front edge of the upper case 20 (decorative sheet) is secured by an opening edge 7a of the upper wall 6 of the bulging portion 2, and the rear edge of the upper case 20 is rotatively moved downward as indicated by arrow A, so as to attach the switch unit 3 to the door trim panel 1. Here, the female connectors 4 are situated as close to the rear edge of the switch unit 3 as possible, so that the female connectors 4 can be smoothly and certainly engaged with the male connectors 5 (shown in FIG. 1).

In FIG. 1, the male connectors 5 stands on the connector securing wall 8. A pair of springs 35 protrude from the outer walls of the male connector housings 34. The male connectors 5 are supported by the springs 35 in a laterally movable state.

Figure 4:
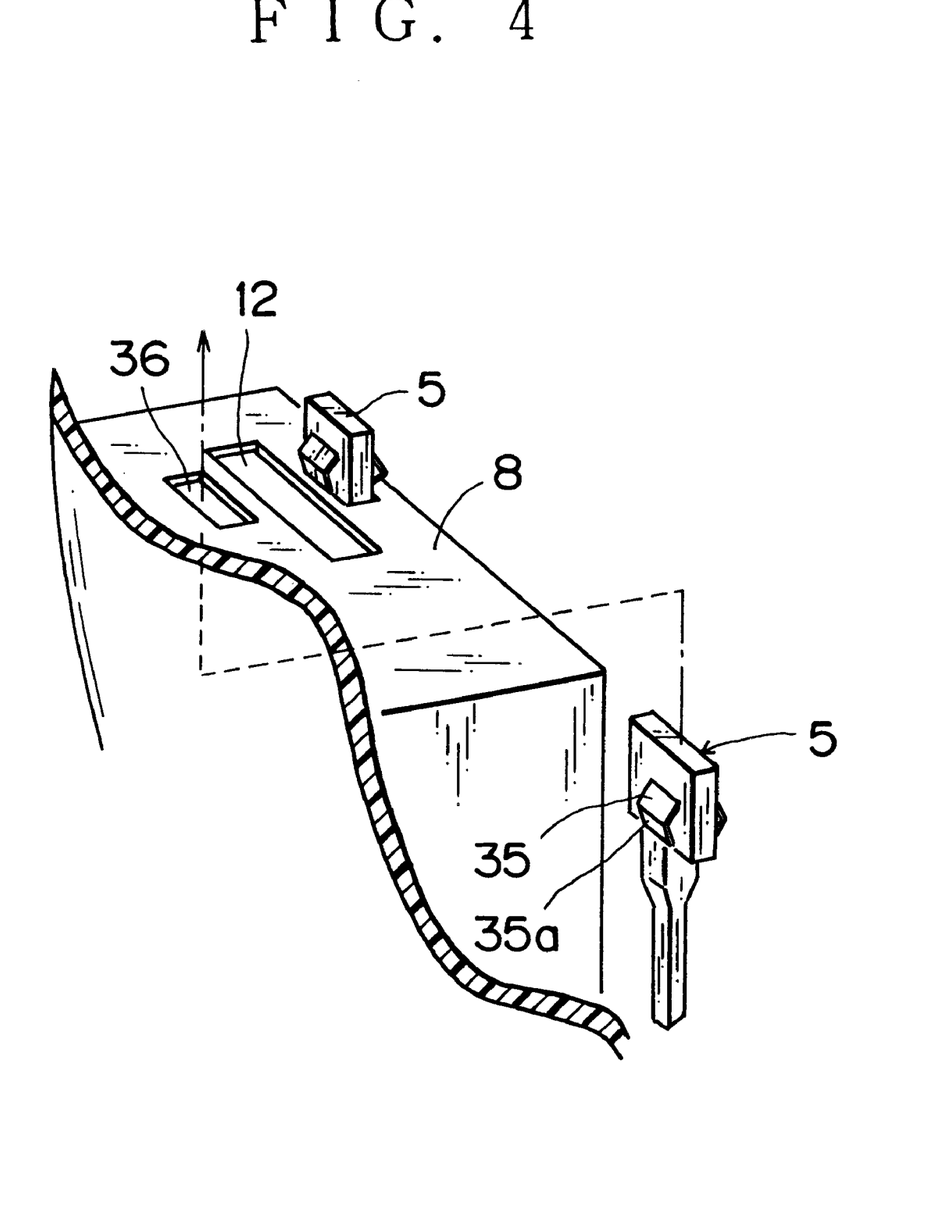
FIG. 4 is a perspective view illustrating how a movable connector is attached to the door trim board.

As shown in FIG. 4, a pair of rectangular connector insertion holes 36 are formed on both sides of the pocket insertion hole 12 of the connector securing wall 8. The male connectors 5 are inserted into the connector insertion holes 36 from below. Here, the switch unit 3 is yet to be attached to the door trim panel 1. The male connectors 5 are situated in parallel with each other in the rear portion of the connector securing wall 8 in compliance with the arrangement of the female connectors 4.

The springs 35 flex and pass through the insertion holes 36, and the bottom edges 35a of the springs 35 are brought into contact with the upper surface of the connector securing wall 8, so that the male connectors 5 are supported on the connector securing wall 8 in a horizontally movable state. The springs 35 are provided with engaging means (not shown) such as engaging protrusions which are engaged with the insertion holes 36 so as to support the male connectors 5 in a laterally movable state.

In FIG. 1, the male connectors 5 are attached to the connector securing wall 8 before the door trim panel 1 is secured to the door inner panel 17. A door wire harness (a circuit body) is connected to female connectors 37 inside the connector housings 34 of the male connectors 5. The door wire harness 38 is arranged along the bottom wall 9 of the bulging portion 2. After the attachment of the male connectors 5, the door trim panel 1 is mounted to the door inner panel 17.

As shown in FIG. 3, the switch unit 3 is rotatively inserted into the bulging portion 2 through the upper opening 7. The female connectors 4 are then connected to the male connectors 5 (initial engagement). Here, the male connectors 5 moves laterally so as to eliminate gaps with the female connectors 4. As shown in FIG. 1, the securing screw 32 is screwed into the weld nut 15 to secure the pocket 11 to the switch unit securing wall 13, so that the male and female connectors 4 and 5 can be engaged automatically with small force. At the same time of the connector engagement, a claw portion 39 (shown in FIG. 3) of the upper case 20 can be engaged with an opening groove 7b.

The securing screw 32 and the weld nut 15 have been used conventionally, but there is no need to employ a novel component for the connector engagement. The structure described above is also effective in connecting connectors only on the door trim panel.

The male and female connectors 4 and 5 are centripetally moved by a driving mechanism 35 to solve displacement and ensure smooth connecting operations. Since the pair of female connectors 4 are arranged on both sides of the pocket 11, a screwing force is equally given to both female connectors 4. Furthermore, since the bottom wall 30 of the pocket 11 is situated lower than the female connectors 4, the female connectors 4 smoothly follow in the vertical direction when the bottom wall 30 is secured by screw tightening. Thus, the male and female connectors 4 and 5 can be smoothly and certainly engaged.

Figure 5:
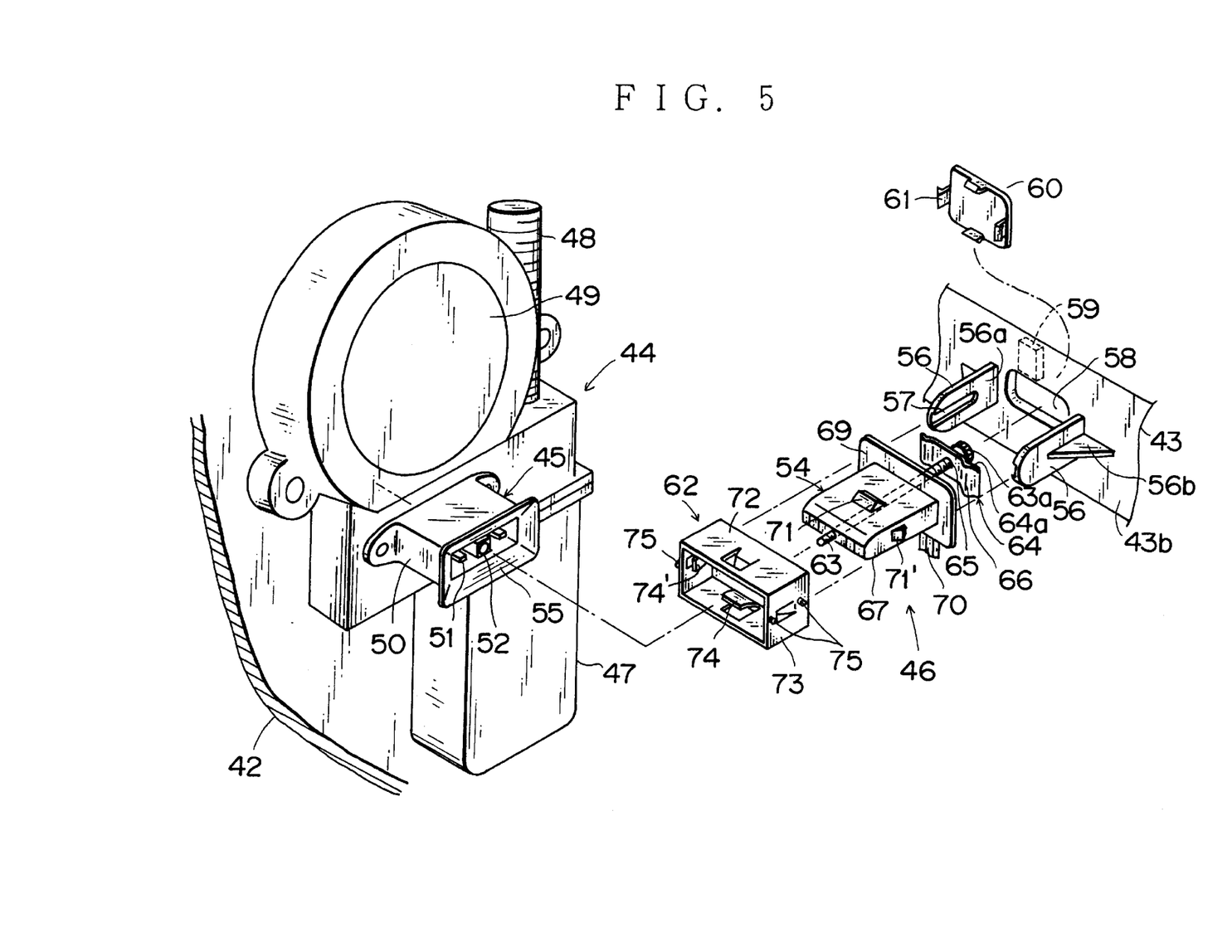
FIG. 5 is an exploded perspective view of a second embodiment of the door trim connector connecting structure of the present invention.
Figure 6:
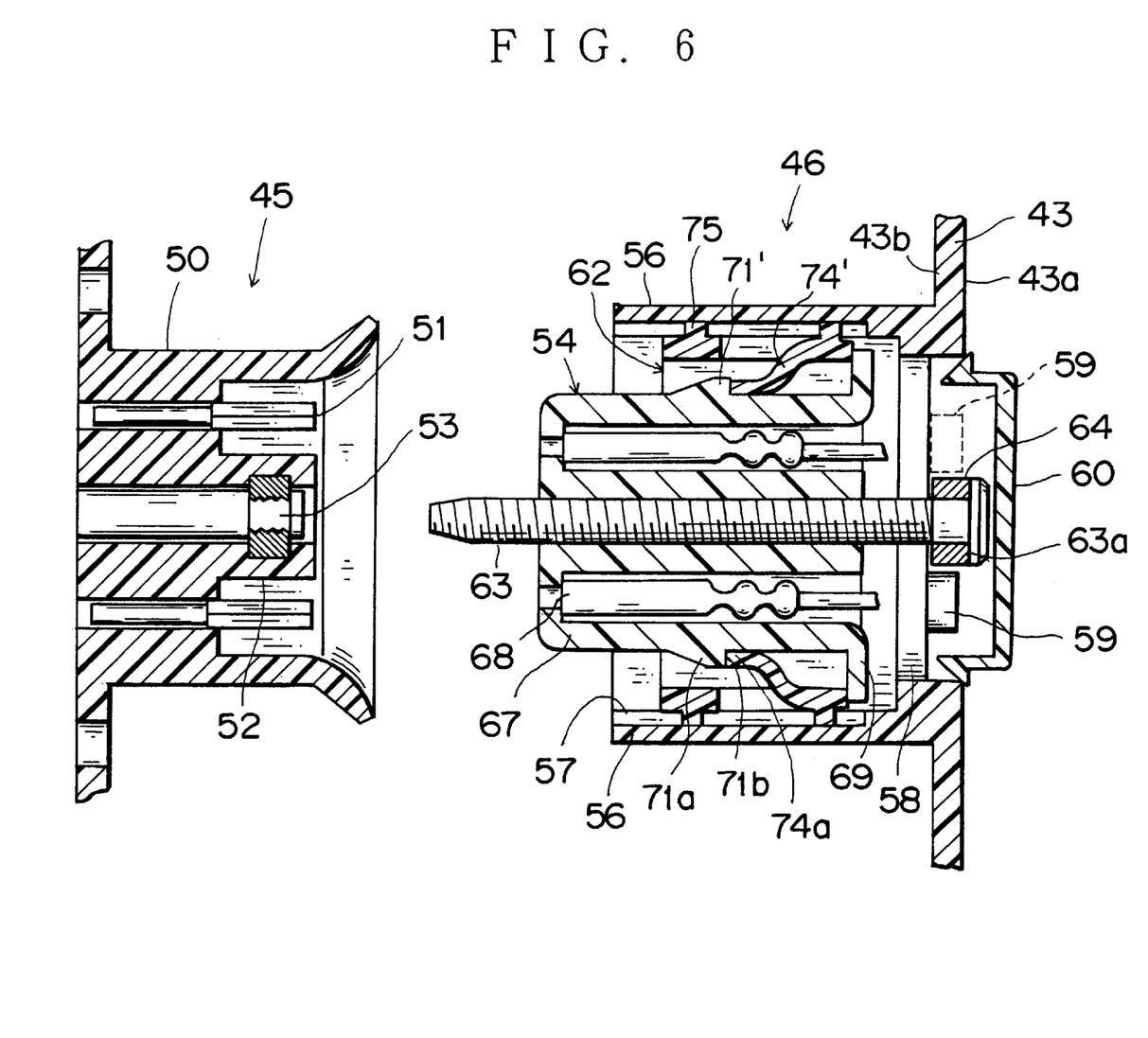
FIG. 6 is a longitudinal sectional view illustrating the connector connecting structure of the second embodiment.

FIGS. 5 and 6 show a second embodiment of the door trim connector connecting structure of the present invention.

In this structure, after a door trim panel 43 is attached to a door inner panel 42, a movable connector 46 which is a waiting connector provided on the door trim panel 43 can be connected to a female connector (fixed connector) 45 provided on one side of an actuator (power window motor unit) 44 on the door inner panel 42.

As shown in FIG. 5, the actuator 44 is provided with a worm 48 rotated by a motor 47 and a pinion 49. The female connector 45 protruding in the horizontal direction is secured on the upper side of the motor 47. The female connector 45 is provided with a pair of male terminals 51 inside a connector housing 50, and a cylindrical nut securing portion 52 between the male terminals 51. A nut 53 (shown in FIG. 6) is secured inside the nut securing portion 52. A tapered guide portion 55 for the male connector main body 54 is formed on the opening side of the male connector housing 50.

The door trim panel 43 is integrally provided with a pair of connector stays 56 on the back side 43b. The pair of stays 56 protrude from the door trim panel 43 in the horizontal direction, and are situated in parallel with each other, with the inner surfaces 56a facing each other. The connector stays 56 are reinforced with outer ribs 56b. Guide grooves 57 are formed on the inner surfaces 56a of the connector stays 56a. Each of the guide grooves 57 leads to the edge of each connector stay 56.

A rectangular insertion hole 58 is formed on the door trim panel 43 between the pair of connector stays 56. On the surfaces 43a of the door trim 43, a block-like stopper 59 is formed above or below the insertion hole 58. The insertion hole 58 is covered with a rectangular cover 60 at the outer surface side of the door trim panel 43 after connector connection. The cover 60 is provided with engaging claws 61 which engages with the fringe of the insertion hole 58.

The movable connector 46 is made up of the male connector main body 54, a frame-like holder 62 for supporting the male connector main body 54 in such state that the male connector main body 54 can move both laterally and vertically, the connector stays 56 for supporting the holder 62 in such state that the holder 62 can move back and forth (in the connector connecting direction), a bolt 63 which rotatably penetrates through the male connector main body 54, and a rectangular trim receiving plate 64 which engages with the head 63a of the bolt 63.

The trim receiving plate 64 is provided with a bolt hole 65 in the mid portion, and the bolt 63 is inserted through the bolt hole 65. The bolt 63 is rotatably mounted to the male connector main body 54 with an E-shaped ring or the like (not shown). The trim receiving plate 64 horizontally penetrates the insertion hole 58, and vertically rotates to bring the side surface 64a into contact with the stopper 59. The trim receiving plate 64 is provided with angular spring portions 66 on both sides in the longitudinal direction so as to absorb excessive tightening force of the bolt 63 when connecting the connectors.

When securing the door trim panel 43 to the door inner panel 42, the trim receiving plate 64 is temporarily fixed by the stopper 59 on the outer surface 43a of the door trim panel 43, and then moved to the back surface 43b of the door trim panel 43 via the insertion hole 58 upon screw tightening of the connector 46.

The bolt 63 penetrates the male connector main body 54 at the center and protrudes from the front edge of the connector 46. The male connector main body 54 includes a male connector housing 67 made of a synthetic resin and a female terminal 68 (shown in FIG. 6) which is held inside the male connector housing 67. An outward flange 69 is integrally formed at the rear end of the male connector housing 67. When the connector 46 is temporarily secured to the door trim panel 43, the flange 69 is brought into contact with the back surface 43b of the door trim panel 43. A wire harness 70 which is a circuit attached to the door trim panel is connected to the female terminals 68.

Stopper protrusions 71 and 71' are integrally formed on the top and bottom and both side outer surfaces of the male connector housing 67. Each of the stopper protrusions 71 and 71' has an inclined guide surface 71a facing forward and a vertical stopper surface 71b facing backward.

Springs 74 and 74' are formed by inwardly cutting and the top and bottom and both side walls of the holder 62 so as to receive the stopper protrusions 71 and 71'. The holder 62 is made of a metal or synthetic resin and takes a frame-like shape. A pair of rectangular slide protrusions 75 to be received by the guide grooves of the connector stays 56 are formed on each outer surface of the side walls 73. The slide protrusions 75 are horizontally arranged in front of and behind the spring 74 and 74'.

The movable connector 46 is mounted to the door trim panel 43 before the door trim panel 43 is attached to the door inner panel 42. As shown in FIG. 6, the holder 62 is attached to the male connector main body 54. The springs 74 and 74' of the holder 62 go over the stopper protrusions 71 and 71' of the male connector main body 54, so that the front edge 74a of each spring can be brought into contact with the stopper surface 71b. The bolt 63 is attached to the male connector main body 54 beforehand. The slide protrusions 75 of the holder 62 are engaged with the guide grooves 57 of the respective connector stays 56 and kept slidable back and forth.

The male connector main body 54 is movable up and down by virtue of the springs 74 and 74', and also movable back and forth by virtue of the guide grooves 57. The trim receiving plate 64 is brought into contact with the surface 43a of the door trim panel 43 via the insertion hole 58, and positioned and temporarily secured by the stopper 59. By doing so, the attachment of the movable connector 46 to the door trim panel 43 is completed.

The door trim panel 43 is then secured to the door inner panel 42. After that, the trim receiving plate 64 is removed from the stopper 59 and rotatively moved until the longitudinal direction of the trim receiving plate 64 corresponds to the longitudinal direction of the insertion hole 58. Thus, the trim receiving plate 64 can be inserted into the insertion hole 58. Under such conditions, the bolt 63 is tightened. At the initial stage of bolt tightening, the head 63a of the bolt 63 slightly protrudes from the insertion hole 58 as shown in FIG. 6. The bolt 63 is tightened by engaging the bolt head 63a with a fitting (not shown) on the side of the surface 43a of the door trim panel 43.

The bolt 63 is screwed to the nut 53 of the mating female connector 45 on the door inner panel 42. By doing so, the trim receiving plate 64 is pushed by the bolt head 63a and brought into contact with the flange 69 of the male connector main body 54. Upon screw tightening, the bolt 63 moves closer to the female connector 45, and the trim receiving plate 64 pushes the male connector main body toward the female connector 45. As a result, the male connector main body 54 is inserted into the female connector 45. The connector housing 50 of the female connector 45 enters into the holder 62 without touching the springs 74 and 74'.

As described so far, after the door trim panel 43 is attached to the door inner panel 42, the movable connector 46 on the door trim panel 43 can be smoothly and certainly engaged with the fixed connector 45 of the actuator 44 on the door inner panel 42. This structure is also effective in connecting connectors only on a door trim panel.

According to the first embodiment of the present invention, a movable connector is inside a bulging portion of a door trim panel, and after the door trim panel is secured to a door inner panel, the switch unit is screwed to the switch unit securing wall, so that the fixed connectors provided on the switch unit can be engaged with the movable connectors inside the bulging portion with small force. With such structure, the connectors can be accurately connected, because the connector connection on the door trim side is not performed at the time of attaching the door trim panel to the door inner panel. The use of a conventional screw unit can simplify the entire structure and reduces production costs. In the first embodiment, the screwing force can act equally on both fixed connectors. Since the fixed connectors are situated at the opposite side to the supporting point on the switch unit, inclination of the fixed connectors can be minimized so as to ensure smooth engagement with the movable connectors.

According to the second embodiment of the present invention, after the door trim panel is attached to the door inner panel, the trim receiving plate is removed from the door trim panel and the bolt is rotatively moved, so that a connector on the door trim side can be smoothly and certainly connected to a connector on the door inner panel side. Since the connector connection does not depend on attachment of the door trim panel, the connectors can be accurately connected in predetermined positions. Here, the positions of the connectors correspond to each other so that the connectors can be surely connected. The holder is movable back and force by virtue of a pair of connector stays, and the trim receiving plate is rotatively moved at an angle of 90°, so that the stopper can be certainly engaged and released. Thus, the movable connector can be temporarily secured to the door trim panel without fail.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A door trim connector connecting structure comprising:
   a door trim panel;
   a movable connector provided on the door trim panel movably in orthogonal directions to a longitudinal axis of the movable connector by means of a spring member;
   a door inner panel;
   a fixed connector to be provided on the door inner panel; and
   a screw unit for screwing the movable connector to the fixed connector, wherein
   the movable connector and the fixed connector are connected at the same time as screwing by means of the screw unit.

2. A door trim connector connecting structure comprising:
   a door trim panel having a bulging portion;
   a door inner panel provided with a switch unit securing wall which is situated inside the bulging portion;
   a switch unit provided with a pocket;
   fixed connectors provided on the switch unit;
   a connector securing wall integrally formed inside the bulging portion;
   movable connectors to be engaged with the fixed connectors, the movable connector being provided on the connector securing wall movably in orthogonal directions to a longitudinal axis of the movable connector by means of a spring member; and
   a screw unit for securing the pocket of the switch unit to the switch unit securing wall at the same time as engaging the fixed connectors and the movable connectors.

3. The door trim connector connecting structure according to the claim 2, wherein
   the switch unit rotatively moves, with one end being a supporting point, so as to enter into the bulging portion, while the fixed connectors are arranged on both sides of the pocket at the opposite end to the supporting point.

4. A door trim connector connecting structure comprising:
   a door trim panel provided with a movable connector;
   a door inner panel provided with an actuator secured thereto;
   a screw unit for screwing the movable connector to a fixed connector provided on the actuator;
   an insertion hole formed on the door trim panel;
   connector stays protruding from the back surface of the door trim panel;
   guide grooves formed on the connector stays in the longitudinal direction;
   a bolt penetrating the movable connector;
   a trim receiving plate which can be inserted through the insertion hole and engaged with the bolt so as to be temporarily secured to the outer surface of the door trim panel in a rotatable state;
   a holder for holding the movable connector so that the movable connector can move vertically and horizontally;
   slide protrusions provided on the holder to be received by the guide grooves; and
   a fixed connector to which a nut is secured,
   wherein
   after the door trim panel is attached to the door inner panel, the trim receiving plate is inserted through the insertion hole, so that the movable connector and the fixed connector can be engaged.

5. The door trim connector connecting structure according to claim 4, wherein
   the connector stays are arranged on both sides of the insertion hole,
   the insertion hole and the trim receiving plate are both rectangular, and
   a stopper for stopping the trim receiving plate is provided on the outer surface of the door trim panel in the longitudinal direction of the insertion hole.

6. The door trim connector connecting structure according to claim 4, wherein
   the connector stays are provided in a pair.

7. The door trim connector connecting structure according to claim 4, wherein
   the trim receiving plate is provided with angular springs on both sides thereof in the longitudinal direction.

* * * * *